United States Patent [19]

Buck

[11] 3,887,091
[45] June 3, 1975

[54] TRANSFER APPARATUS FOR BULK GRAPES

[75] Inventor: Charles Herbert Buck, Acampo, Calif.

[73] Assignee: Liberty Winery, Inc., Acampo, Calif.

[22] Filed: May 18, 1973

[21] Appl. No.: 361,660

[52] U.S. Cl. ............... 214/38 R; 214/45; 214/64; 214/701 P
[51] Int. Cl. .......................................... B65g 67/02
[58] Field of Search ......... 214/4 S, 41, 38 R, 46.34, 214/64, 701 R, 701 P, 313, 146.5, 660, 185 C, 630, 731, 700, 705, 703; 298/17.5

[56] References Cited
UNITED STATES PATENTS

| | | | |
|---|---|---|---|
| 748,331 | 12/1903 | Allison | 214/45 |
| 1,590,826 | 6/1926 | Hulett | 214/45 |
| 2,281,498 | 4/1942 | Hyson | 214/41 |
| 2,579,409 | 12/1951 | White | 214/18 R |
| 3,314,550 | 4/1967 | McCready | 214/18 SC |
| 3,438,510 | 4/1969 | Fawell | 212/128 |

FOREIGN PATENTS OR APPLICATIONS

| | | | |
|---|---|---|---|
| 958,164 | 5/1974 | United Kingdom | 214/18 SC |
| 22,117 | 10/1902 | United Kingdom | 214/45 |

*Primary Examiner*—Robert J. Spar
*Assistant Examiner*—Gary Auton
*Attorney, Agent, or Firm*—Roger B. Webster

[57] ABSTRACT

An apparatus-for transferring bulk grapes from the tiltable bin of a field cart at an unloading station to the bin of a highway truck at an adjacent but spaced-apart loading station-comprising a main frame upstanding between such stations and having a power-actuated elevator guided thereon for movement between a lowered position and a raised position, and a power-actuated, tiltable transfer bin unit on the elevator adapted-in the lowered position of said elevator--to receive bulk grapes from the field cart upon tilting of the bin of the latter, and--in the raised position of such elevator--to tilt and discharge such bulk grapes into a bin of the highway truck. The transfer bin unit includes three separate bins disposed in side-by-side relation and selectively and independently power-tiltable; such transfer bin unit being supported by a power-actuated carriage included in the elevator and shiftable toward the unloading station to dispose said bin unit in a position to receive bulk grapes from the field cart, or toward the loading station to dispose said bin unit in a position for discharge of the bulk grapes into the bin of the highway truck.

3 Claims, 10 Drawing Figures

TRANSFER APPARATUS FOR BULK GRAPES

BACKGROUND OF THE INVENTION

In the harvest of wine grapes, they are handled in bulk first in field carts having a laterally tiltable bin into which the grapes, as picked, are deposited. The field carts are then moved to a central station where the bulk grapes are transferred from such field carts into large, open-top bins of highway trucks which thence carry the bulk grapes to the winery. Such transfer of the bulk grapes has heretofore been accomplished by sundry apparatus none of which has been entirely satisfactory. The present invention was conceived in a successful effort to provide an improved apparatus for such purpose.

SUMMARY OF THE INVENTION

The present invention provides, as a major object, an apparatus for transferring bulk grapes from the tiltable bin of a field cart at an unloading station to a bin of a highway truck at an adjacent but spaced-apart loading station which is operative to accomplish such bulk grape transfer in an expeditious and efficient manner, with undesirable crushing of the grapes and their stems minimized, and loading of the highway truck accomplished in a flow-regulated manner.

The present invention provides, as another important object, an apparatus, as above, which embodies a novel transfer bin unit mounted for vertical travel so that it can be disposed in a relatively low position to receive bulk grapes discharged from the tilted bin of the filed cart at the unloading station, and a relatively high position to discharge the bulk grapes into a bin of the highway truck at the loading station.

The present invention provides, as a further important object, an apparatus, as above, in which the transfer bin unit supported by a power-actuated elevator guided in an upstanding main frame is comprised of a plurality of separate side-by-side bins selectively and independently tiltable by mechanism under the control of an operator at an observation platform. Such observation platform is located adjacent the loading station and at an elevated point from which such tiltable bins, and the discharge flow of bulk grapes therefrom into a bin of the highway truck, can be seen and controlled by the operator.

The present invention provides, as still another important object, an apparatus, as above, wherein the transfer bin unit is mounted on a carriage included in the elevator and horizontally power-shiftable toward the unloading station or toward the loading station; the operator, from the observation platform, also controlling such shifting of the carriage in the direction and to the extent desired.

The present invention provides, as a further object, a transfer apparatus for bulk grapes which is designed for ease and economy of manufacture, and convenience of use.

The present invention provides, as a still further object, a practical, reliable, and durable transfer apparatus for bulk grapes, and one which is exceedingly effective for the purpose for which it is designed.

DESCRIPTION OF THE PREFERRED EMBODIMENT

Figure 1:
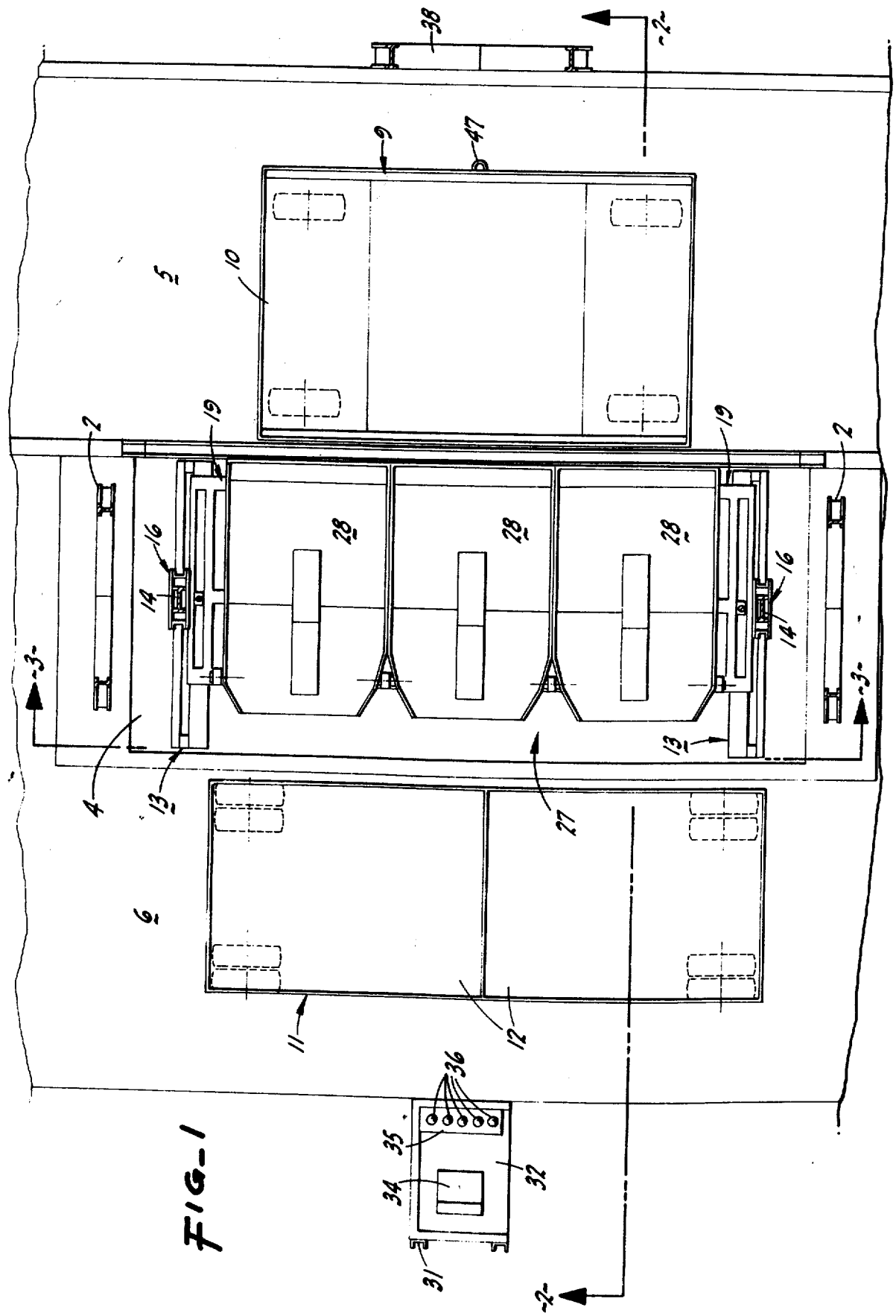
FIG. 1 is a sectional plan view of the apparatus; the view, taken substantially on line 1—1 of FIG. 2, showing the positions of the field cart and highway truck laterally relative to the transfer bin unit.

Referring now more particularly to the drawings and to the characters of reference marked thereon, the apparatus comprises an upstanding main frame, indicated generally at 1, of large inverted U-shape; such main frame including longitudinally spaced towers 2 and a bridge 3 which spans in connected relation between the upper ends of such towers. The towers 2 upstand at opposite ends of an elongated pit 4, and the latter is disposed between laterally spaced, parallel roadways 5 and 6; such roadways defining in transverse alinement a field cart unloading station 7 and a highway truck loading station 8, respectively. The roadway 5 is in the form of a double-ended ramp, as shown, so that the unloading station 7 is elevated relative to the loading station 8. The unloading station 7 when the apparatus is in use is occupied by a field cart 9 having a laterally tiltable bin 10 adapted to discharge in the direction of the pit 4, while the loading station 8 is occupied by a highway truck 11 (or trailer thereof) having a load-receiving bin 12 thereon; the bin 12 in certain instances--comprising separate end-to-end bin sections.

The apparatus functions to transfer bulk grapes from the bin 10 of field cart 9 to the receiving bin 12 of the highway truck 11, and in association with the main frame 1 includes a horizontal, elongated elevator 13 which extends between the towers 2. The elevator 13 is guided, at its ends, for up and down travel on vertical guide rails 14 which form a part of the towers 2.

More particularly, the elevator 13 embodies, at each end, a cross beam 15, and the latter is provided with a slide assembly, indicated generally at 16, which runs on the related guide rail 14, and includes upper and lower roller-type slides 17 and 18, respectively.

A horizontal, elongated, bed-like carriage 19 forms a part of the elevator 13 and spans between the cross beams 15 thereof; such carriage being (as shown) roller mounted at its ends on said cross beams 15 for lateral transitional movement from one side to the other of the elevator 13; i.e., for sliding retraction toward the unloading station 7 or sliding advance toward the loading station 8, respectively. Such lateral sliding movement of the bed-like carriage 19 is accomplished by double-acting power cylinders 20 disposed transversely of the carriage and connected between the cross beams 15 and corresponding parts of said carriage.

The elevator 13 is suspended at its ends from the bridge 3, and moved up and down, by means of double-acting, elongated, vertical power cylinders 21 connected between such bridge 3 and the cross beams 15 of the elevator; the latter being counterbalanced, in its vertical movement, by cables 22 which lead upward from the lower slides 18, turn over bridge-mounted sheaves 23 and 24, and thence depend to connection with a counterweight 25 vertically movable in a housing 26 at one end of the main frame 1.

The carriage 19 is fitted on top with a transfer bin unit 27 comprised of a longitudinal row of closely adjacent, side-by-side bins 28 (here, three in number); such bins 28, of side-pouring or dump-type, being pivoted or hinged at the side adjacent the loading station 8 and a distance above the carriage 19, as at 29, for selective and independent upward and laterally outward swinging motion from an upright, load-receiving position to a raised, laterally tilted position for side-discharging a load therefrom at an elevated point directly avove the highway truck loading station 8. The individual bins 28, of the transfer bin unit 27, are selectively and independently swung between their upright load-receiving position and load-discharging position by double-acting, upstanding, power cylinders 30 each connected between the carriage 19 and the underside of the corresponding bin 28 at an advantageous angle of leverage relative to the axis of the related pivot 29.

A centrally disposed pier 31 upstands to the side of the roadway 6 opposite the main frame 1, and an elevated observation platform 32 accessible from the ground by stairs 33 is supported by such pier and includes an operator's station provided by a seat 34. From the seat 34, an operator has a view across the loading station 8 of the apparatus, especially the elevator 13 and carriage-mounted transfer bin unit 27 when in raised position.

A console 35 is mounted in front of the seat 34, and includes a plurality of upstanding, selectively manipulated control levers 36; such levers working the valves of a conventional, valve-regulated, hydraulic conduit system by means of which the power cylinders 20 (in unison), the power cylinders 21 (in unison), and the power cylinders 30 (independently of each other), are caused to operate. Such hydraulic conduit system for the sake of clarity is not shown. The pier 31 is stabilized by a top cross beam 37 which spans the loading station 8 and connects to the bridge 3.

A centrally disposed pier 38 upstands to the side of roadway 5 opposite the main frame 1 and a top cross beam 39 spans the unloading station 7 from said pier 38 to and beyond the bridge 3. Such top cross beam 39 is secured to the underside of the bridge 3, and serves as the track for a traveling electric hoist 40 movable to and fro on beam 39 by a cable system 41 operated from an electric motor-driven windlass unit 42 mounted on the bridge 3. The hoist 40 includes a depending lift cable system 43 having a lower end hook 44 thereon, and such hoist is controlled by a push-button switch box 45 on the lower end of an electric cable 46 which depends from said hoist.

Figure 2:
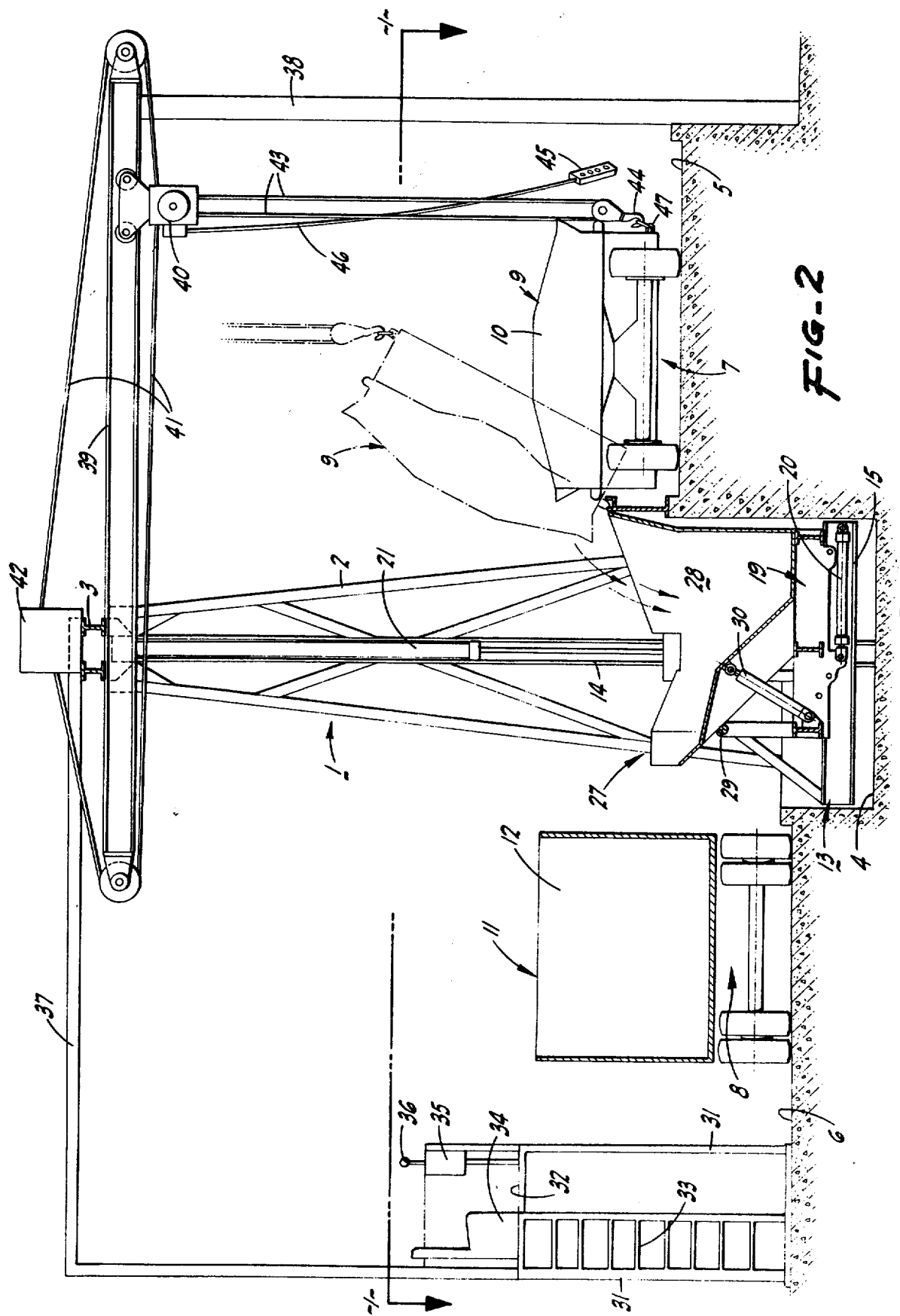
FIG. 2 is a transverse vertical section taken substantially on line 2—2 of FIG. 1; the view showing the transfer bin unit in lowered position to receive bulk grapes discharged from the field cart.
Figure 3:
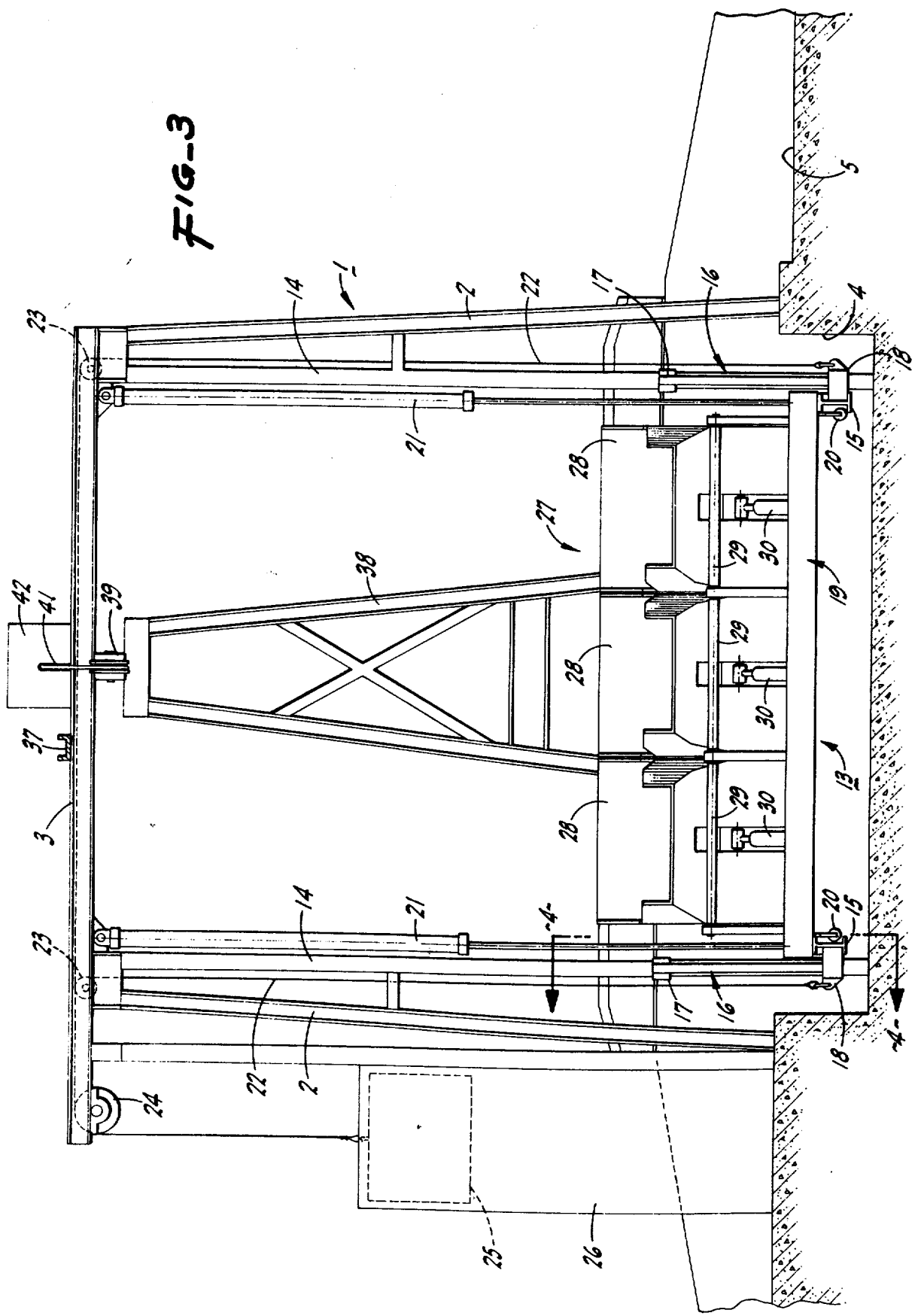
FIG. 3 is a longitudinal vertical section taken substantially on line 3—3 of FIG. 1; this view also showing, in the assembly of the apparatus, the transfer bin unit in lowered position.
Figure 4:
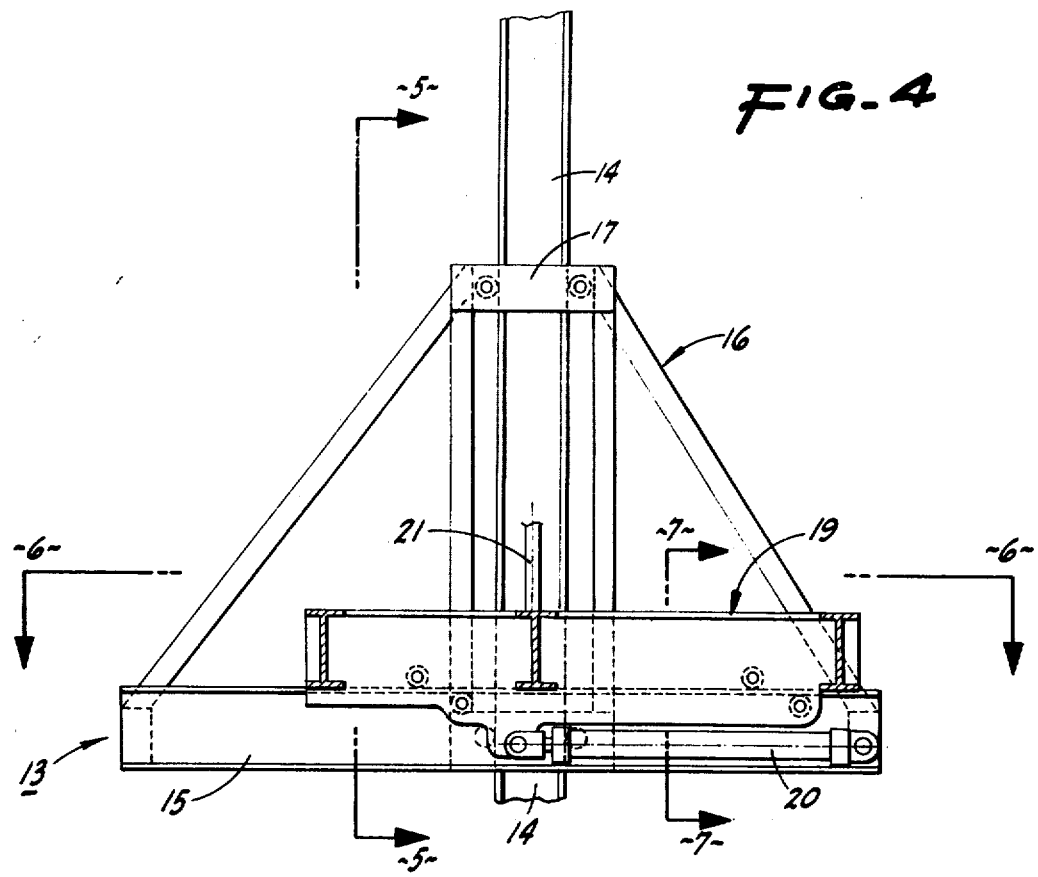
FIG. 4 is an enlarged fragmmentary transverse elevation taken substantially on line 4—4 of FIG. 3.
Figure 6:
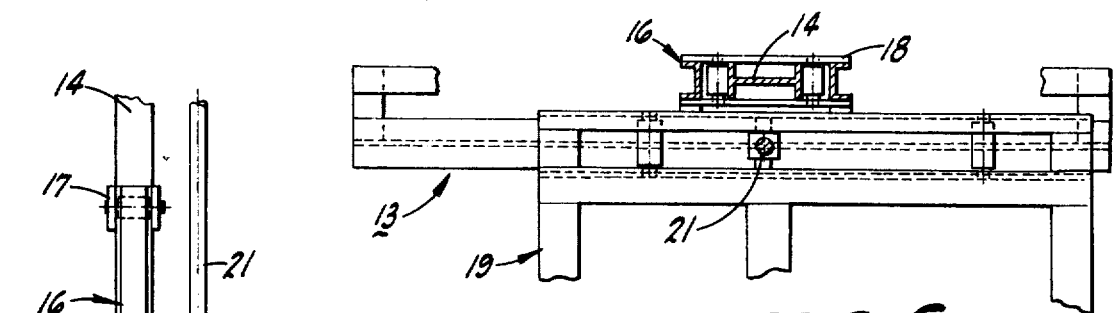
FIG. 6 is a fragmentary horizontal section taken substantially on line 6—6 of FIG. 4.
Figure 5:
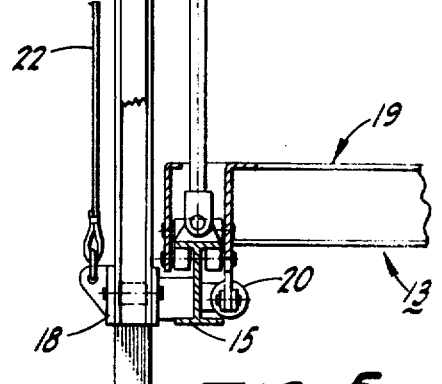
FIG. 5 is a fragmentary vertical section taken substantially on line 5—5 of FIG. 4.
Figure 7:
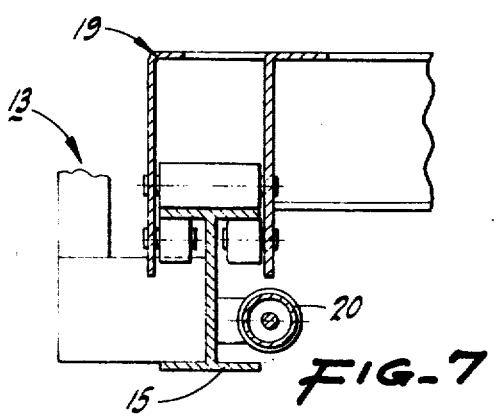
FIG. 7 is a fragmentary vertical section taken substantially on line 7—7 of FIG. 4.

In use of the above-described apparatus mainly under the control of the operator from seat 34 the elevator 13 is initially in lowered position in the pit 4, and the carriage 19 is slidably retracted toward the unloading station 7; a field cart 9 loaded with bulk grapes being disposed at such station 7 with the bin 10 alined with the transfer bin unit 27 which then occupies an adjacent but lower position. Thereafter, the hook 44 is engaged with a ring 47 on the outer side of the field cart bin 10, and by suitably operating the hoist 400 said bin 10 is lifted on said outer side by cable system 43 and caused to tilt laterally inwardly whence the load of bulk grapes in such bin 10 is discharged into the adjacent and then upright bins 28 of the transfer bin unit 27 (see FIG. 2).

Figure 8:
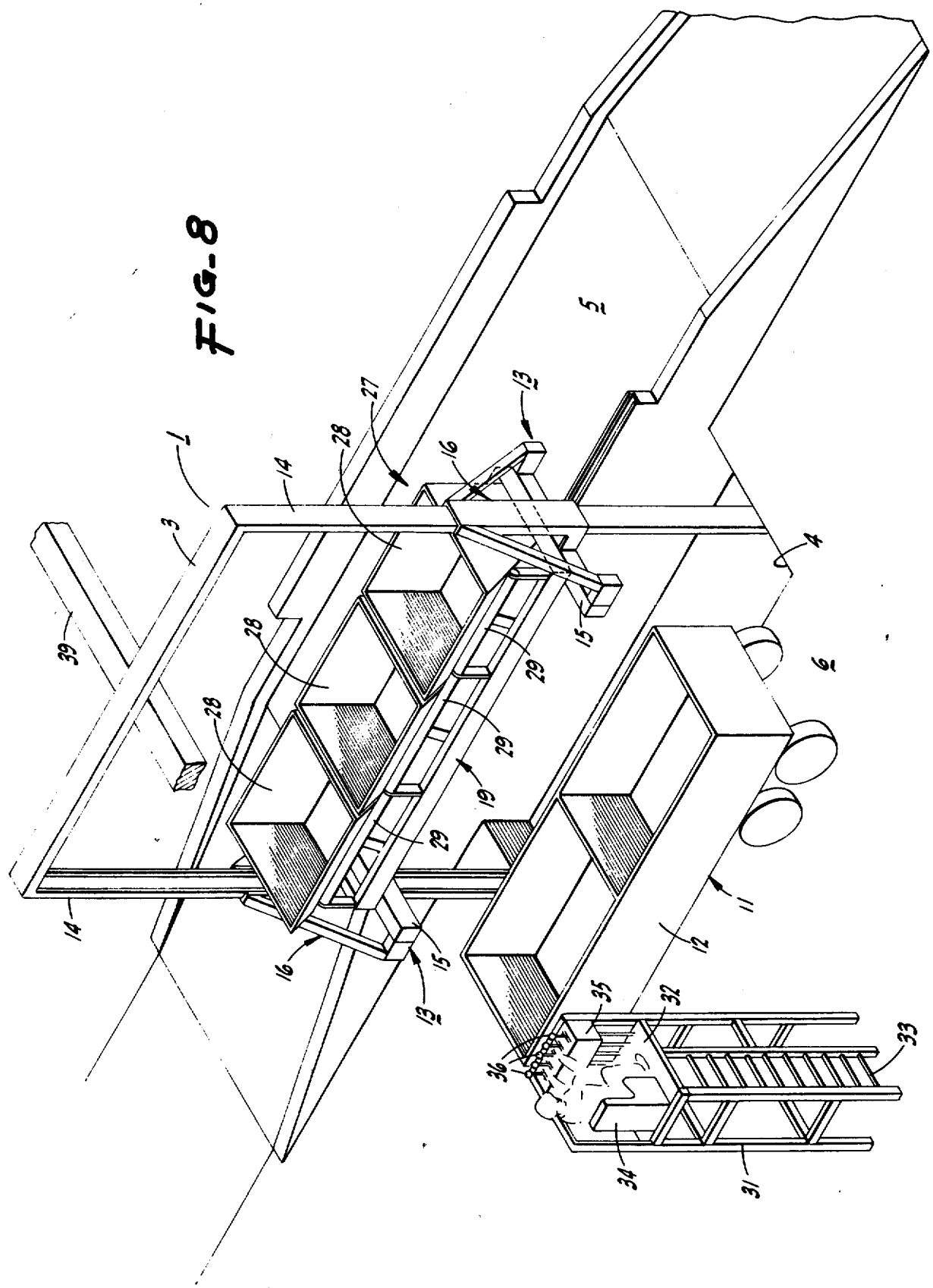
FIG. 8 is a somewhat diagrammatic illustration, in perspective, of the apparatus with the transfer bin unit in raised position preparatory to discharge of bulk grapes therefrom into a bin of the highway truck.
Figure 9:
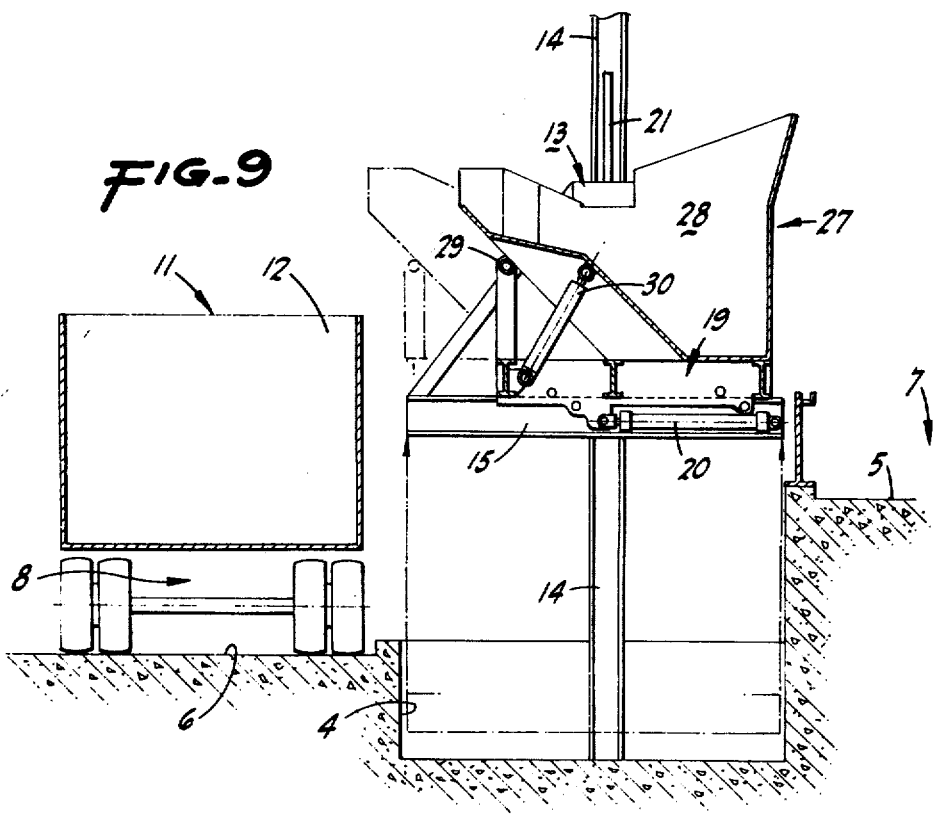
FIG. 9 is a view similar to FIG. 2, but shows essentially diagrammatically the transfer bin unit in raised position; retracted toward the unloading station, as in full lines, and advanced, as in broken lines, toward the loading station.

Upon the load of bulk grapes thus being introduced into the bins 28, and the field cart bin 10 returned to its normal transport position, the elevator 13 is moved to a raised position and the carriage 19 is slidably advanced (see FIG. 9) toward the loading station which disposes the transfer bin unit 27 adjacent but a distance above bin 12 of the highway truck at said loading station (see FIG. 8).

Figure 10:
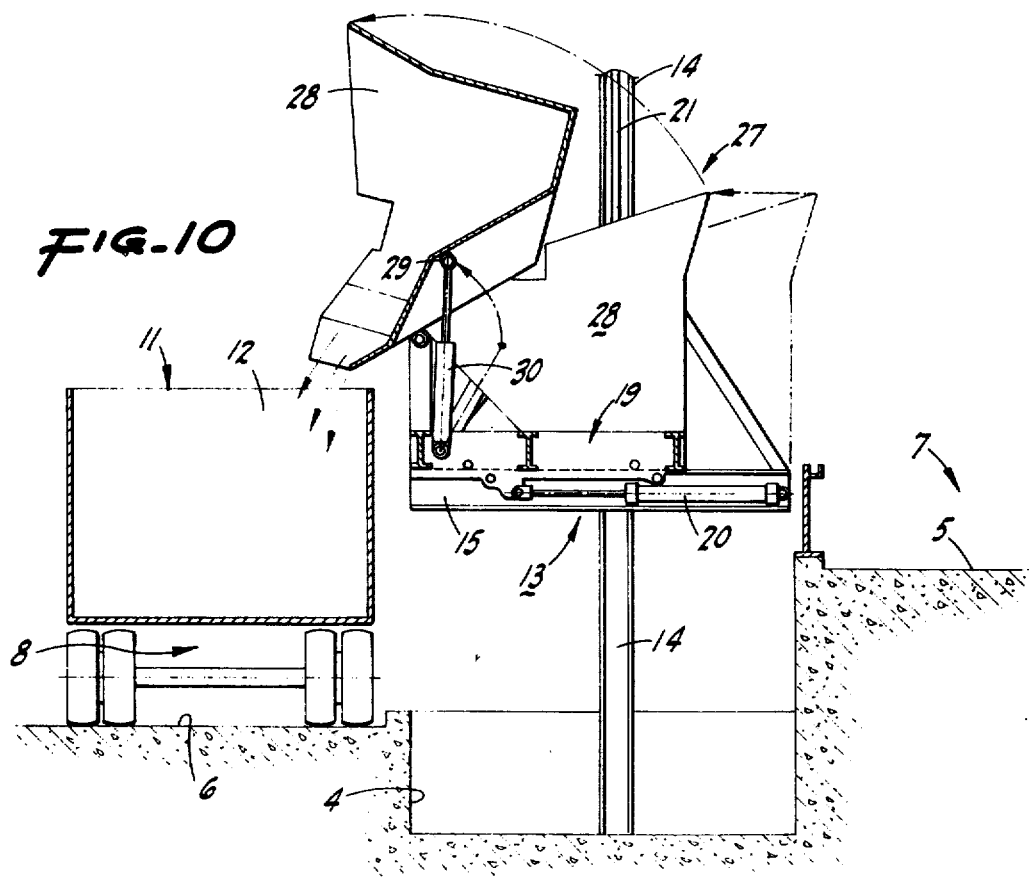
FIG. 10 is a view similar to FIG. 9, but shows the near one of the bins, of the advanced transfer bin unit, tilted to discharge bulk grapes therefrom into a bin of the highway truck.

Nextly, the individual bins 28 of the transfer bin unit 27 are one-at-a-time tilted from an initial upright position to a discharge position (see FIG. 10) whereby each bin load of bulk grapes is discharged and falls into bin 12 of the highway truck 11 (or trailer thereof). By dumping or unloading the individual bins 28 one at a time, better and more uniform loading of the highway truck bin 12 can be accomplished, and, additionally, by successively discharging the bulk grapes into said bin 12 in a limited quantity, undesirable crushing of the grapes and their stems is minimized. Also, to this end, the extent and speed of tilt of the bins 28 and consequently the rate of discharge of the bulk grapes therefrom can be readily controlled. Further, each such bin 28 can be completely or partially emptied at any given time as loading conditions may require.

Thus, with the described apparatus, bulk grapes can, with efficiency and a minimum of labor, be easily and rapidly transferred from a field cart to a highway truck, and with a minimum of undesirable crushing of the grapes and their stems; crushing of the stems being especially deleterious to the flavor of the wine subsequently produced from such grapes.

From the foregoing description, it will be readily seen that there has been produced such a transfer apparatus for bulk grapes as substantially fulfills the objects of the invention, as set forth herein.

While this specification sets forth in detail the present and preferred construction of the transfer apparatus for bulk grapes, still in practice such deviations from such detail may be resorted to as do not form a departure from the spirit of the invention as defined by the appended claims.

I claim:

1. Apparatus for transferring bulk grapes from the bin of a field cart at an unloading station to a bin of a highway truck at an adjacent but spaced-apart loading station, comprising a main frame upstanding between such stations, a power-actuated elevator guided on the main frame for vertical movement between a lowered position and a raised position, and a power-actuated transfer bin unit supported on the elevator and adapted in the lowered position of said elevator to receive bulk grapes discharged from the field cart and in the raised position of such elevator to discharge such bulk grapes into the bin of the highway truck; the elevator including a bed-like carriage thereon, the transfer bin unit being supported by the carriage, means mounting the carriage on the elevator for guided shifting movement laterally of the main frame to dispose the transfer bin unit adjacent the unloading station when the elevator is in lowered position and to dispose the transfer bin unit adjacent the loading station when the elevator is in raised position, and power means between the elevator and carriage operative to so shift the latter; and the transfer bin unit including a longitudinal row of separate side-by-side bins, means pivotally mounting the separate bins on the carriage for independent tilting but all in a like direction to discharge into the bin of the highway truck at the loading station when the transfer bin unit is adjacent thereto, and power means between the carriage and the separate bins operative to selectively and independently tilt said bins in such like direction.

2. Apparatus, as in claim 1, in which said shifting power means comprises a pair of power cylinders disposed in spaced, parallel relation; the elevator including cross beams at the ends, and said power cylinders being connected between such cross beams and corresponding parts of the carriage.

3. Apparatus, as in claim 1, in which said tilting power means comprises a separate and corresponding power cylinder upstanding in connected relation between the carriage and the underside of each bin in bin-tilting relation.

* * * * *